(12) United States Patent
Chen et al.

(10) Patent No.: US 7,012,796 B2
(45) Date of Patent: Mar. 14, 2006

(54) ELECTROSTATIC DISCHARGE PROTECTION APPARATUS

(75) Inventors: Sheng-Guo Chen, Taipei (TW); Cheng-Nan Chen, Taipei (TW)

(73) Assignee: Arima Computer Corporation, Taipei (TW)

( * ) Notice: Subject to any disclaimer, the term of this patent is extended or adjusted under 35 U.S.C. 154(b) by 471 days.

(21) Appl. No.: 10/442,105

(22) Filed: May 21, 2003

(65) Prior Publication Data

US 2004/0233597 A1  Nov. 25, 2004

(51) Int. Cl.
*H05F 3/00*  (2006.01)
(52) U.S. Cl. ........................ 361/220; 361/816
(58) Field of Classification Search .............. 361/220, 361/816, 679; 174/35 R
See application file for complete search history.

(56) References Cited

U.S. PATENT DOCUMENTS

| | | | | |
|---|---|---|---|---|
| 4,041,300 | A * | 8/1977 | Blount | 362/13 |
| 5,652,410 | A * | 7/1997 | Hobbs et al. | 174/35 R |
| 6,570,085 | B1 * | 5/2003 | Gabower | 174/35 MS |
| 6,624,353 | B1 * | 9/2003 | Gabower | 174/35 R |
| 6,763,576 | B1 * | 7/2004 | Watchko et al. | 29/825 |
| 6,822,823 | B1 * | 11/2004 | Tsuwako et al. | 360/97.01 |
| 2004/0007834 | A1 * | 1/2004 | Kohler et al. | 277/650 |

* cited by examiner

*Primary Examiner*—Brian Sircus
*Assistant Examiner*—Boris Benenson

(57) ABSTRACT

An electrostatic discharge protection apparatus is described. A multi-hole conductive layer is placed between a multi-hole structure and an electronic element of an electronic device. The multi-hole electric conductive layer contacts a conductive layer on the inside surface of a case of the electronic device. It dissipates the electric charges accumulated on the multi-hole structure because of a lack of the conductive layer, and thus prevents the accumulated electric charges from discharging to damage the electronic element.

22 Claims, 5 Drawing Sheets

ELECTROSTATIC DISCHARGE PROTECTION APPARATUS

BACKGROUND OF THE INVENTION

1. Field of Invention

The present invention relates to an electrostatic discharge protection apparatus. More particularly, the present invention relates to an electrostatic discharge protection apparatus for a multi-hole structure.

2. Description of Related Art

Electronic devices, such as monitors, notebook computers and mobile telephones, are easily damaged by electrostatic discharge (ESD) that affects normal operations of these electronic devices. The transient voltage induced by electrostatic discharge is very large, and as the scale of integrated circuit elements is reduced, the threshold electrostatic voltage that may cause electrostatic discharge also becomes smaller. In practical use, some high-speed electronic devices may be damaged when the magnitude of the electrostatic is only 30 V.

The reason of electrostatic discharging is because an electric field formed by charged objects ionizes surrounding gases to induce discharge. Both conductors and nonconductors can induce and accumulate electric charges. Generally, a material with low resistance easily dissipates electric charges, but a material with high resistance dissipates electric charges with difficulty. For this reason, nonconductors very easily accumulate electrostatic charges. Artificial polymers, like plastics, are able to gather and keep electrostatic charges for a long time due to their high resistance.

Electrostatic discharges include direct electrostatic discharges and indirect electrostatic discharges. The direct electrostatic discharges are further divided into contact discharge and air discharge according to their different discharge methods. The indirect electrostatic discharges are also further divided into horizontal coupling place (HCP) discharge and vertical coupling place (VCP) discharge.

Many kinds of anti-electrostatic discharging software and hardware are provided to avoid the electrostatic discharges damage electronic devices. For nonconductors, a method for avoiding accumulating a large quantity of electric charge is to apply a coating of anti-electrostatic material, such as carbon powder, anti-static agents, or metal films on their surfaces. The anti-electrostatic materials on surfaces of nonconductors form a conductive layer to dissipate accumulated charges to other places. Another method is to add carbon powder, anti-static agents, metal powder, or metal fibers into nonconductors during production thereof to convert nonconductors into anti-electrostatic material or conductors.

Grounding is the most effective and efficient way to avoid electrostatic discharge. Electric charges accumulated on an object discharging all energies in one electrostatic discharge are the main reason for the fatal damage caused by electrostatic discharge. Accordingly, connecting all objects together, then grounding, and keeping low resistance between them can dissipate electric charges accumulated thereon to the ground, and thus avoids the damage caused by electrostatic discharge.

Manufacturers usually apply ESD tests to the electronic devices to ensure capability of resisting electrostatic discharge and maintenance of a steady condition. The environment of the ESD test is a temperature of: 15° C.–35° C.; relative humidity: 30%–60%; and an atmospheric pressure of: 68 Kpa (680 mbar)–106 Kpa (1060 mbar). The ESD test simulates electrostatic discharge to test whether electronic devices effectively avoid electrostatic discharge under different discharging conditions.

FIG. 1A illustrates a schematic view of a conventional notebook computer. The notebook computer 100 includes a covering case 102 and a body 104. The covering case 102 is usually composed of artificial polymers, like plastics, to reduce the weight and the manufacturing expenses thereof. The body 104 includes a speaker 114 that is an electronic device. The speaker 114 is located in a speaker output port 112, which facilitates sound emission of speaker 114.

FIG. 1B illustrates a schematic back view of the covering case in FIG. 1A. The surface of the covering case 102 easily accumulates electric charges because its material is a nonconductor, like plastic. A prior method to dissipate electric charges accumulated on the covering case 102 is the addition of a conductive layer 122 on an inside surface thereof, for example, spreading conductive lacquer on the inside surface. The electric charges accumulated on the surface of the covering case 102 are thus dissipated to the ground, and damage caused by electrostatic discharge is avoided.

However, the speaker output port 112 on the covering case 102 is a multi-hole structure. The multi-hole structure includes many and dense holes, which facilitates sound generation of the speaker 114. The conductive lacquer squeezes out through the multi-hole structure onto the outside surface of the covering case 102 during spreading. Hence, conductive layer 122 is usually not added to the inside surface of the covering case 102 where the speaker output port 112 located, for fear of the conductive layer 122, such as a conductive lacquer, soiling the appearance of the notebook computer 100. In the ESD test of the notebook computer 100, the speaker output port 112 generally fails the ESD test because of the inside surface thereof lacks the conductive layer 122.

SUMMARY OF THE INVENTION

It is therefore an objective of the present invention to provide an electrostatic discharge protection apparatus that satisfies the need to improve the electrostatic discharge protection ability of the conventional multi-hole structures of electronic devices.

In accordance with the foregoing and other objectives of the present invention, an electrostatic discharge protection apparatus is described. A multi-hole conductive layer is placed between the multi-hole structure and the electronic element of the electronic device. The multi-hole conductive layer is conductive, and contacts the conductive layer on the inside surface of the covering case of the electronic device. The multi-hole conductive layer in contact with the conductive layer dissipates the electric charges accumulated on the multi-hole structure to other places. The multi-hole conductive layer therefore prevents the electric charges accumulated on the multi-hole structure from inducing electrostatic discharge to damage the electronic device.

In one preferred embodiments of the present inventions, the multi-hole conductive layer is a conductive cloth, which is a metal fiber textile having many small holes. In another preferred embodiment of the present inventions, the multi-hole conductive layer is a metal film, and the material of the metal film is aluminum, copper, or other metal that is conductive and processed easily.

A multi-hole plastic layer is further placed between the multi-hole conductive layer and the electronic device to support the conductive layer. The advantages of the multi-hole plastic layer are that it is cheaper and firmer than the multi-hole conductive layer.

Furthermore, a filter is placed between the multi-hole conductive layer and the electronic device as a dust keeper. The filter filters the dust from outside environment to protect the electronic element.

In conclusion, the present invention improves the electrostatic discharge protection ability of the conventional multi-hole structures of the electronic devices. Only a multi-hole conductive layer is placed between the multi-hole structure and the electronic element; the multi-hole conductive layer is in contact with the conductive layer on the inside surface of the covering case to dissipate the electric charges accumulated on the multi-hole structure. Additionally, a multi-hole plastic layer can be placed to support the multi-hole conductive layer, such that the multi-hole conductive layer does not need to be too thick, which saves cost. Therefore, the present invention provides an effective and efficient electrostatic discharge protection apparatus.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
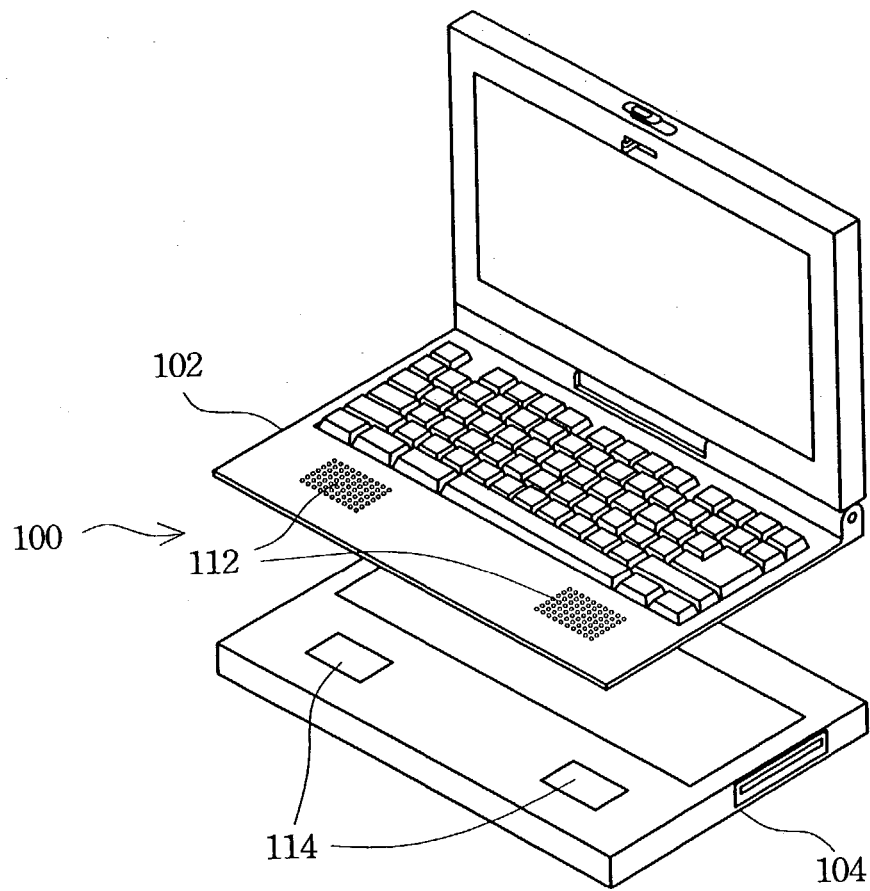
FIG. 1A illustrates a schematic view for a conventional notebook computer.
Figure 1B:
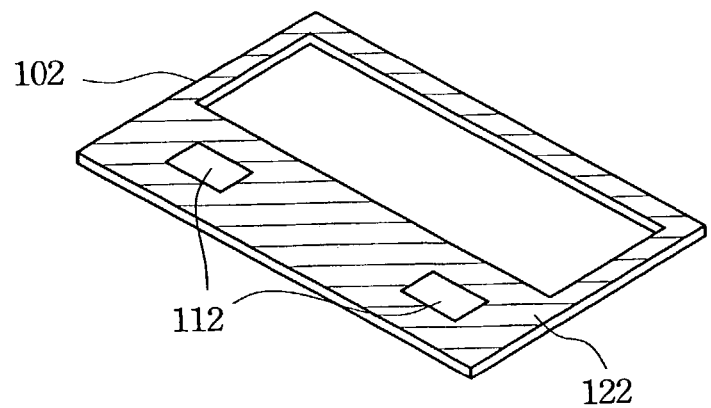
FIG. 1B illustrates a schematic back view for the covering case in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

The present invention provides an electrostatic discharge protection apparatus to improve the electrostatic discharge protection ability of the conventional multi-hole structures of the electronic devices.

The present invention places a multi-hole conductive layer between the multi-hole structure and the electronic element of the electronic device. The multi-hole conductive layer is conductive, and contacts the conductive layer on the inside surface of the covering case of the electronic device. The multi-hole conductive layer contacting the conductive layer dissipates the electric charges accumulated on the multi-hole structure to other places. The multi-hole conductive layer therefore prevents the electric charges accumulated on the multi-hole structure from inducing electrostatic discharge to damage the electronic device. The following descriptions illustrate the electrostatic discharge protection apparatus of the present invention in conjunction with FIG. 2A–2D and FIG. 1A–1B.

Figure 2A:
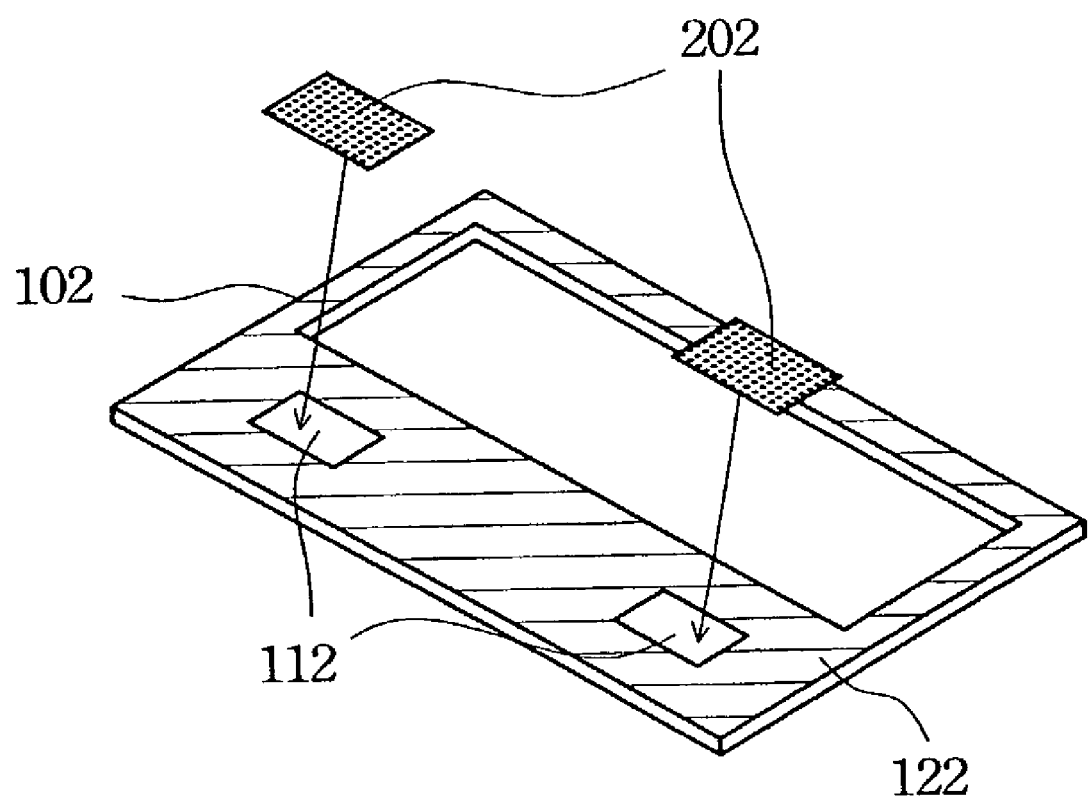
FIG. 2A illustrates a schematic view of one preferred embodiment of this invention.
Figure 2B:
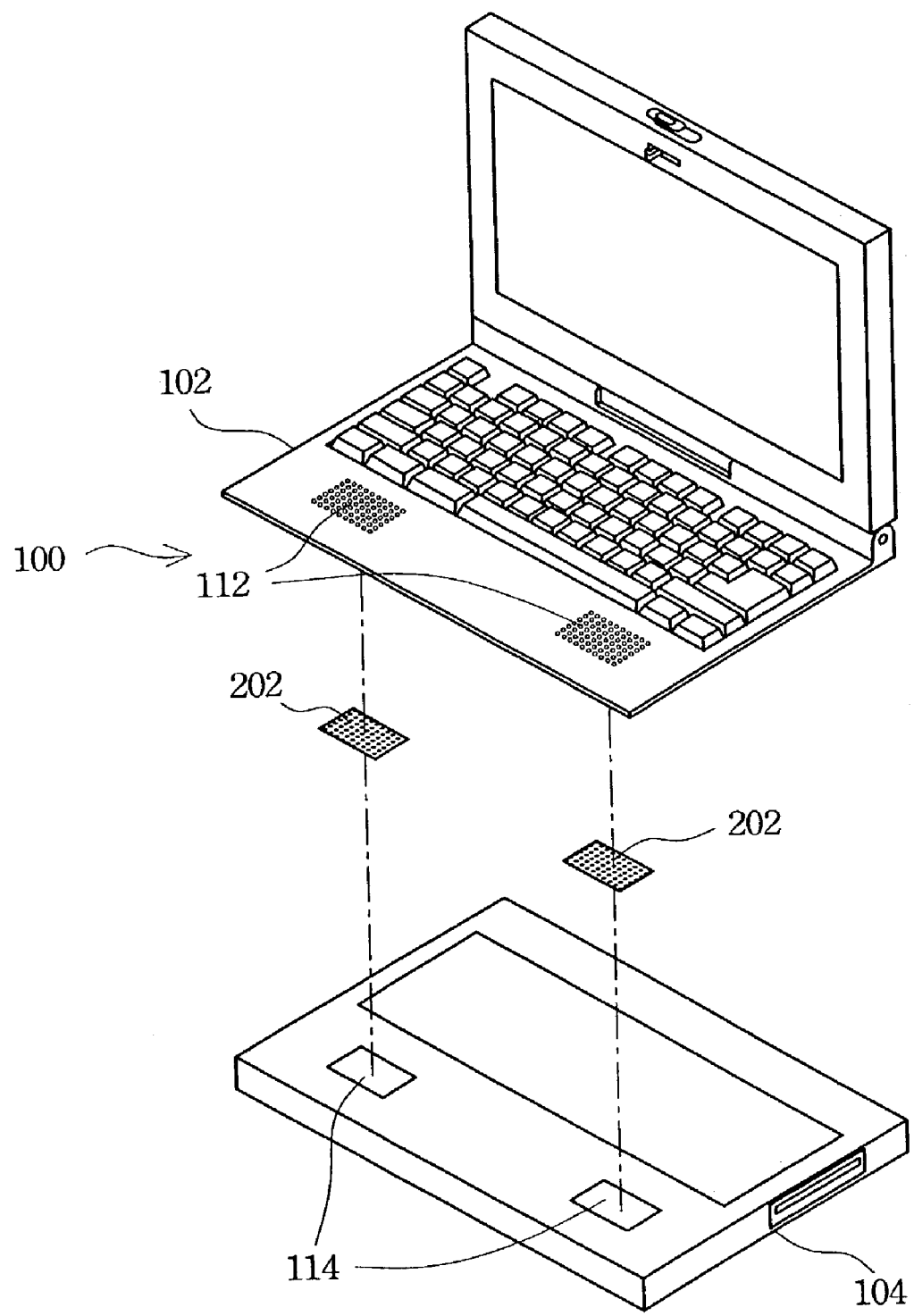
FIG. 2B illustrates a schematic view of a notebook computer using the embodiment of FIG. 2A.

FIG. 2A illustrates a schematic view of one preferred embodiment of this invention. In this preferred embodiment, the multi-hole conductive layer is a conductive cloth 202 placed between the speaker 114 and the speaker output port 112. The conductive cloth 202 contacts the conductive layer 122 on the inside surface of the covering case 102, dissipating the electric charges accumulated on the speaker output port 112 to other places. Thus electric charges accumulated on the speaker output port 112 are prevented from discharging to damage the speaker 114 or the notebook computer 100. FIG. 2B illustrates a view of a notebook computer using the embodiment of FIG. 2A.

The conductive cloth 202 is a metal fiber textile. The warp of the metal fiber textile is a metal fiber that is a conductor, and the woof of the metal fiber textile is a polyethylene terephthalate (PET) fiber. From experimental results, the density of the metal fiber textile affects the electromagnetic interference and the electrostatic voltage thereof. Appropriate metal fiber textiles can thus be selected as the conductive cloth 202 according to the demands of the electrostatic discharge protection specifications. Furthermore, the conductive cloth 202 is a structure having many small holes, which did not hinder the speaker 114 from normal operation.

In another preferred embodiment of this invention, the multi-hole conductive layer is a metal film placed between the speaker 114 and the speaker output port 112. The material of the metal film is aluminum, copper, or other metal that is conductive and processed easily. The metal film dissipates the electric charges accumulated on the speaker output port 112 to other places. In addition, it is also able to make some holes in the metal film to facilitate sound production of the speaker 114.

Because the multi-hole conductive layer, like conductive cloth 202, placed between the electronic element and the multi-hole structure is expensive, a thin multi-hole conductive layer is generally used to save the cost. But this results in the conductive cloth 202 becoming less supported and hard to be fixed in place. A multi-hole plastic layer 204 is therefore used to support the conductive layer 202. The multi-hole plastic layer 204 is cheap and processed easily; it can be cut into any shape and holes made therein to satisfy the present invention.

Figure 2C:
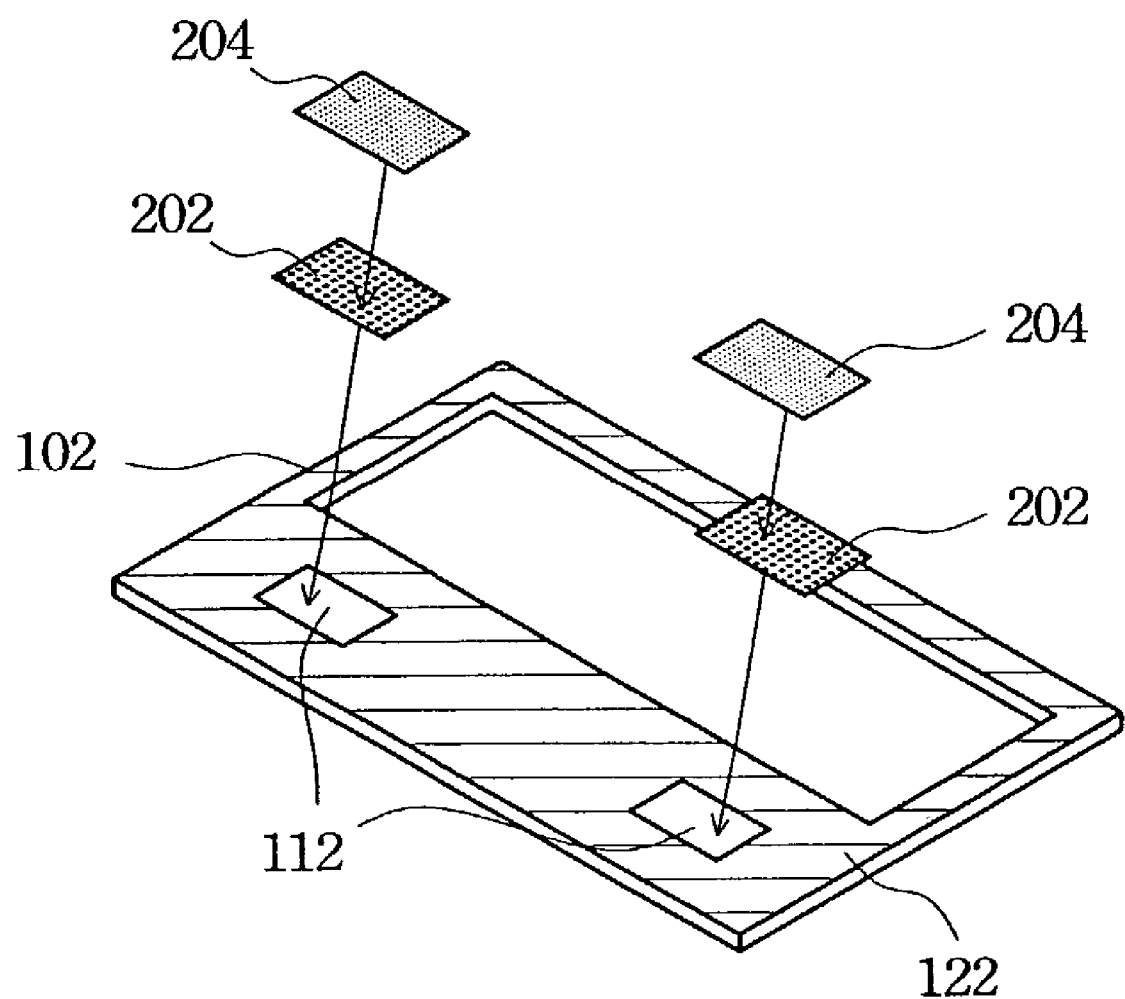
FIG. 2C illustrates a schematic view of another preferred embodiment of this invention.

The metal film used in another embodiment is very thin; therefore, the multi-hole plastic layer 204 can also be placed between the electronic element and the metal film, as FIG. 2C illustrates. Thus the metal film is fixed well to contact the conductive layer 122 on the inside surface of the covering case 102, and then dissipate the electric charges accumulated on the speaker output port 112.

Figure 2D:
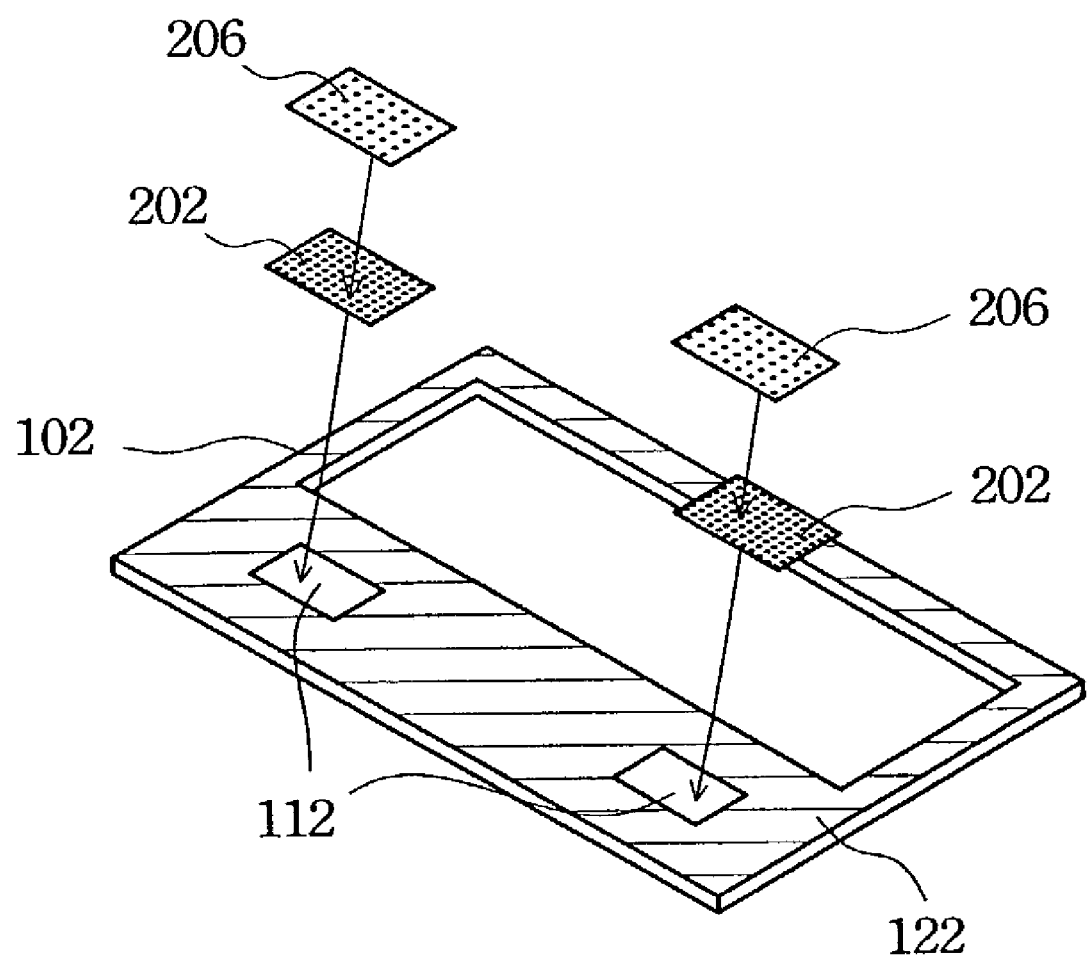
FIG. 2D illustrates a schematic view of another preferred embodiment of this invention.

Besides, some electronic devices, like speaker 114, need a filter to cover the same as a dust keeper. A filter 206 is placed between conductive cloth 202 and the speaker 114 in the invention, as FIG. 2D illustrates. Thus filter 206 filters dust from outside environment to protect speaker 114.

In conclusion, the present invention improves the electrostatic discharge protection ability of the conventional multi-hole structures of the electronic devices. Only one multi-hole conductive layer is placed between the multi-hole structure and the electronic element and the multi-hole conductive layer contacts the conductive layer on the inside surface of the covering case to dissipate the electric charges accumulated on the multi-hole structure. Additionally, a multi-hole plastic layer can be placed to support the multi-hole conductive layer, such that the multi-hole conductive layer needs not be too thick, which saves costs. Therefore, the present invention provides an effective and efficient electrostatic discharge protection apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electrostatic discharge protection apparatus, configured in an electronic device, the electronic device including an insulated case and at least one electronic element, the electronic element being in the insulated case, the electrostatic discharge protection apparatus comprising:
 a multi-hole structure, located on the insulated case and corresponding to the electronic element;
 a conductive layer, formed on an inside surface of the insulated case and around the multi-hole structure; and
 a multi-hole conductive layer, placed between the multi-hole structure and the electronic element, the multi-hole conductive layer contacting the conductive layer to prevent the multi-hole structure from accumulating electric charges to induce electrostatic discharging to damage the electronic element.

2. The electrostatic discharge protection apparatus of claim 1, wherein the electronic device is a portable electronic device.

3. The electrostatic discharge protection apparatus of claim 1, wherein the multi-hole structure is a speaker output port.

4. The electrostatic discharge protection apparatus of claim 1, wherein the electronic element is a speaker.

5. The electrostatic discharge protection apparatus of claim 1, wherein the multi-hole conductive layer is a conductive cloth.

6. The electrostatic discharge protection apparatus of claim 1, wherein the conductive cloth is a metal fiber textile.

7. The electrostatic discharge protection apparatus of claim 1, wherein the multi-hole conductive layer is a metal film.

8. The electrostatic discharge protection apparatus of claim 7, wherein a material of the metal film comprises aluminum.

9. The electrostatic discharge protection apparatus of claim 7, wherein a material of the metal film comprises copper.

10. The electrostatic discharge protection apparatus of claim 1, wherein the electrostatic discharge protection apparatus further comprises:
 a multi-hole plastic layer, placed between the multi-hole conductive layer and the electronic element to support the multi-hole conductive layer.

11. The electrostatic discharge protection apparatus of claim 1, wherein the electrostatic discharge protection apparatus further comprises:
 a filter, placed between the multi-hole conductive layer and the electronic element to protect the electronic element from dust.

12. An electronic device having an insulated case and at least one electronic element, wherein the electronic element is in the insulated case, the insulated case has a multi-hole structure corresponding to the electronic element, and a conductive layer is formed on the inside surface of the insulated case and around the multi-hole structure, an improvement comprising:
 a multi-hole conductive layer, placed between the multi-hole structure and the electronic element, the multi-hole conductive layer contacting the conductive layer to prevent the multi-hole structure from accumulating electric charges to induce electrostatic discharging to damage the electronic element.

13. The electronic device of claim 12, wherein the electronic device is a portable electronic device.

14. The electronic device of claim 12, wherein the multi-hole structure is a speaker output port.

15. The electronic device of claim 12, wherein the electronic element is a speaker.

16. The electronic device of claim 12, wherein the multi-hole conductive layer is a conductive cloth.

17. The electronic device of claim 16, wherein the conductive cloth is a metal fiber textile.

18. The electronic device of claim 12, wherein the multi-hole conductive layer is a metal film.

19. The electronic device of claim 18, wherein a material of the metal film comprises aluminum.

20. The electronic device of claim 18, wherein a material of the metal film comprises copper.

21. The electronic device of claim 12, wherein the electronic device further comprises:
 a multi-hole plastic layer, placed between the multi-hole conductive layer and the electronic element to support the multi-hole conductive layer.

22. The electronic device of claim 12, wherein the electronic device further comprises:
 a filter, placed between the multi-hole conductive layer and the electronic element to protect the electronic element from dust.

* * * * *